(12) United States Patent
Stattelmann et al.

(10) Patent No.: US 10,466,671 B2
(45) Date of Patent: Nov. 5, 2019

(54) SYSTEM AND METHOD FOR AN OPTIMIZED OPERATION OF REAL-TIME EMBEDDED SOLUTIONS IN INDUSTRIAL AUTOMATION

(71) Applicant: ABB AG, Mannheim (DE)

(72) Inventors: Stefan Stattelmann, Sankt Leon-Rot (DE); Manuel Oriol, Zurich (CH)

(73) Assignee: ABB AG, Mannheim (DE)

( * ) Notice: Subject to any disclaimer, the term of this patent is extended or adjusted under 35 U.S.C. 154(b) by 1177 days.

(21) Appl. No.: 14/678,234

(22) Filed: Apr. 3, 2015

(65) Prior Publication Data
US 2015/0286203 A1    Oct. 8, 2015

(30) Foreign Application Priority Data

Apr. 4, 2014 (EP) .................................. 14001258

(51) Int. Cl.
*G05B 19/042* (2006.01)
*G05B 11/01* (2006.01)
*G05B 19/05* (2006.01)

(52) U.S. Cl.
CPC .......... *G05B 19/0428* (2013.01); *G05B 11/01* (2013.01); *G05B 19/058* (2013.01);
(Continued)

(58) Field of Classification Search
None
See application file for complete search history.

(56) References Cited

U.S. PATENT DOCUMENTS

| 7,007,270 B2 * | 2/2006 | Martin | G06F 11/3447 |
| | | | 714/E11.197 |
| 8,276,135 B2 * | 9/2012 | Master | G06F 17/5022 |
| | | | 717/161 |

(Continued)

FOREIGN PATENT DOCUMENTS

| EP | 2 568 346 A1 | 3/2013 |
| WO | WO 2013/010159 A1 | 1/2013 |

OTHER PUBLICATIONS

Harbour, M. González, et al. "Mast: Modeling and analysis suite for real time applications." Proceedings 13th Euromicro Conference on Real-Time Systems. IEEE, 2001. Retrieved on [Jun. 17, 2019] Retrievedfrom the Internet< https://ieeexplore.ieee.org/abstract/document/934015> (Year: 2001).*

(Continued)

*Primary Examiner* — Thuy Dao
*Assistant Examiner* — Cheneca Smith
(74) *Attorney, Agent, or Firm* — Taft Stettinius & Hollister LLP; J. Bruce Schelkopf

(57) ABSTRACT

A system and method for optimized operation of real-time control applications. The system and method being configured for identifying and processing recurring code sequences in control applications to quantify the execution time of control applications, wherein for each set up and/or control application a timing data structure is generated to determine the execution time of control applications in industrial automation, determining execution times of control applications based on recurring code sequences that are automatically extracted from a set of training applications and/or identified in the respective application, automatically generating test data to determine their on-target execution times for refinement of the timing data structure, decomposing the structure of the respective control application into code sequences for which the created data timing structure (Continued)

and timing model respectively provide execution time estimates, and determining at least an estimate for the best-case execution time and/or the worst-case execution time of the control application.

6 Claims, 5 Drawing Sheets

(52) U.S. Cl.
CPC .............. *G05B 2219/14065* (2013.01); *G05B 2219/24015* (2013.01); *G05B 2219/24036* (2013.01)

(56) References Cited

U.S. PATENT DOCUMENTS

| | | | | |
|---|---|---|---|---|
| 9,032,379 | B2* | 5/2015 | Kalogeropulos | G06F 8/443 717/152 |
| 2002/0166112 | A1* | 11/2002 | Martin | G06F 11/3447 717/124 |
| 2004/0010785 | A1* | 1/2004 | Chauvel | G06F 11/3419 717/158 |
| 2007/0299638 | A1* | 12/2007 | Tantawi | G06F 11/3452 703/2 |
| 2008/0295071 | A1* | 11/2008 | Schellekens | G06F 11/3447 717/106 |
| 2011/0271127 | A1* | 11/2011 | Thabet | G06F 1/3203 713/320 |
| 2013/0191106 | A1* | 7/2013 | Kephart | G05B 17/02 703/21 |
| 2013/0219402 | A1 | 8/2013 | Andrianiaina et al. | |
| 2014/0165077 | A1 | 6/2014 | Martinez Canedo et al. | |
| 2014/0380289 | A1* | 12/2014 | Kalogeropulos | G06F 8/443 717/152 |

OTHER PUBLICATIONS

Samii, Soheil, et al. "A simulation methodology for worst-case response time estimation of distributed real-time systems." Proceedings of the conference on Design, automation and test in Europe. ACM, 2008.Retrieved on [Jun. 17, 2019] Retrieved from the Internet:URL (Year: 2008).*

European Search Report dated Aug. 6, 2014.

* cited by examiner

| | | | |
|---|---|---|---|
| 00000000 | 7C0802A6 | mflr | r0 |
| 00000004 | 9421FF80 | stwu | r1,-128(r1) |
| 00000008 | 90010084 | stw | r0,132(r1) |
| 0000000C | 822E0014 | lwz | r17,20(r14) |
| 00000010 | 82310000 | lwz | r17,0(r17) |
| 00000014 | 82310000 | lwz | r17,0(r17) |
| 00000018 | 2C110000 | cmpwi | r17,0 |
| 0000001C | 41A2007C | bc | 13,2,0x000098 |

Label: 4

| | | | |
|---|---|---|---|
| 00000020 | 818E001C | lwz | r12,28(r14) |
| 00000024 | 718C0008 | andi. | r12,r12,0x0008 |
| 00000028 | 4082001C | bne | cr0,0x000044 |
| 0000002C | 818E002C | lwz | r12,32(r14) |
| 00000030 | 7D8803A6 | mtlr | r12 |
| 00000034 | 4E800021 | blrl | |
| 00000038 | 818E001C | lwz | r12,28(r14) |
| 0000003C | 718C0001 | andi. | r12,r12,0x0001 |
| 00000040 | 41820058 | beq | cr0,0x000098 |

Label: 5

| | | | |
|---|---|---|---|
| 00000044 | 81610000 | lwz | r11,0(r1) |
| 00000048 | 800B0004 | lwz | r0,4(r11) |
| 0000004C | 7C0803A6 | mtlr | r0 |
| 00000050 | 7D615B78 | mr | r1,r11 |
| 00000054 | 4E800020 | blr | cr0 |

Fig. 4

|  | Basic Block | | Window=16, Stride=8 | | Window=8, Stride=4 | |
|---|---|---|---|---|---|---|
| Project | Recurring Regions | Instruction Coverage | Recurring Regions | Instruction Coverage | Recurring Regions | Instruction Coverage |
| OGP1 | 3024 | 54.13% | 5902 | 82.50% | 12634 | 94.34% |
| Mining1 | 14593 | 65.16% | 64058 | 88.22% | 134097 | 97.55% |
| Mining2 | 4309 | 62.51% | 14213 | 87.35% | 29634 | 97.37% |

Fig.5

|  | Window=16, Stride=1 | | Window=8, Stride=1 | | Window=4, Stride=1 | |
|---|---|---|---|---|---|---|
| Project | Recurring Regions | Instruction Coverage | Recurring Regions | Instruction Coverage | Recurring Regions | Instruction Coverage |
| OGP1 | 46278 | 93.27% | 50344 | 98.68% | 52678 | 99.89% |
| Mining1 | 503423 | 97.20% | 533533 | 99.67% | 544413 | 99.99% |
| Mining2 | 108878 | 96.52% | 116403 | 99.55% | 119228 | 99.99% |

Fig.6

```
 1   J:=101;
 2   for I:=1 to 100 by 2 do
 3       if ARR[I] = 70 then
 4           J:= I;
 5           ARR[I]:=1;
 6           exit;
 7       end_if;
 8       ARR[I]:=1;
 9   end_for;
10   ...
```

BCET — ACET ————————→ WCET
  8    25                807

ACET=1·9+1·4+1·6 1·10=29

SYSTEM AND METHOD FOR AN OPTIMIZED OPERATION OF REAL-TIME EMBEDDED SOLUTIONS IN INDUSTRIAL AUTOMATION

RELATED APPLICATION(S)

This application claims priority under 35 U.S.C. § 119 to European application 14001258.4 filed on Apr. 4, 2014, the entire content of which is hereby incorporated by reference.

FIELD

The disclosure relates to system and method for an optimized operation of real-time embedded solutions, in particular control applications and systems, in industrial automation, wherein for each set up and/or control application a timing data structure is generated to determine the execution time of control applications in industrial automation to ensure and provide an optimized real time operation of the respective industrial control solution.

BACKGROUND INFORMATION

When a new automation system or plant is designed, the control application is also developed. Many application components are taken from domain-specific application libraries, for example for oil & gas or the chemical industry. Thus, these components are available from the beginning of the design, but other parts will have to be developed from scratch. The control application and software respectively will be executed on control devices (controllers) which are located within the plant, usually in proximity to the process which is supervised by the control application and/or underlying control algorithm. The number and location of the specified controllers therefore depend on the plant design and the processes being controlled.

A controller includes at least one of a CPU, a data processing unit, computation modules, communication modules for reading sensor data or exchanging data with other controllers, a power supply, interfaces and various accessories. The computation modules and/or processing units for example in most cases are available in different performance levels which relate to the number and complexity of computations they can perform, but more powerful computation modules cause or specify higher technical efforts (design, cooling, environmental conditions or specifications) and higher failure rates in production and finally are more expensive in production as well as in use. Furthermore, it seems to be desirable to have processing units which can be used in a broader variety of control devices.

The respective control application or software as well as the related or underlying algorithms are executed in a cyclic fashion, wherein values are read from I/O devices, the control application and contained control algorithms are executed, and the resulting control parameters are transferred and/or written back to the devices. These operations are activated in predetermined intervals in real-time, for example in the range of about 500 ms, and have to be finished within this timeframe. Thus, the controller hardware has to be chosen in a way that the control algorithms can be executed within the given deadline and for time interval. However, according to complexity and for cost and/or effort reasons it is very desirable to use cheapest and/or simplest computation module and/or processing units which can execute the respective task.

In the automation industry, a control system that controls the behavior of a device, such as a machine, an engine or a drive, or how a process in the process industry should respond to inputs, such as signal inputs, within a specific amount of time, such as in real-time, to ensure a proper operation of said device and/or process.

If one component is present that makes up the response time and accordingly the execution time it can be advisable to determine the software or application worst case execution time, so that the designer/operator of the respective control system can use this information to optimize the system, such as according to its hardware and/or software and at least its operation, to ensure that the system responds fast enough and in real-time.

A real-time system or application in the context of this application can be understood as a system or application which guarantees to respond within strict predeterminable time constraints, time limits, or time frames, also referred to as "deadlines". Real-time responses can be in the range of milliseconds or microseconds.

Calculating the time a piece or segment of code is going to take to execute has always been a difficult problem. In most cases, it is impossible as it relates to the halting problem which is indeterminable.

In real-time systems, such as real-time control systems in automation industry, calculating the longest time a piece of code might take to execute (Worst-Case Execution time—WCET) on a specific hardware platform, such as specific execution unit like a CPU, which can include a microprocessor or another processing device, can be key to ensuring and providing reliable and/or correct functional behavior or operation of said system.

To get an estimate for the WCET despite its inability to be determined, approximation techniques have to be used or applied, wherein there are two known main approaches to approximate the WCET of a software component or an application component on a specific hardware platform.

The first one relates to the testing or in-situation profiling of a piece of code and use the execution time of diverse executions to calculate the WCET through heuristics and the second one relates to the static analysis of the application code and determining or calculating the WCET using a model or a data structure representing the applied hardware.

The first variant entails that sufficient code coverage can be achieved during the measurements and that the worst-case execution time for every program or application statement has been observed. In practice, these specifications cannot always be fulfilled and therefore the WCET might be under-approximated. For systems with hard real-time specifications, like control systems in automation industry or process industry, this is unsound and potentially unsafe.

Static WCET analysis includes the manual development of a hardware model for the target processor which estimates the execution time based on formal methods. This is a long and costly process. The abstraction underlying the model approximates the execution time in a conservative fashion, thereby leading to an over-approximation of the actual WCET. As the resulting WCET estimate is guaranteed to be an upper bound for every possible execution time of a program or an application, the approach can be safely applied in systems with hard real-time demands.

In automation technology or automation industry there is a slow move and development from well controlled hardware to commodity hardware with many possible execution units, like for example CPU (central processing unit), GPU (global processing unit), FPGA (field programmable gate array), DSP (digital signal processor).

In such systems, the diversity of hardware components and/or configurations makes it impractical and almost impossible to manually develop a new static timing model for every possible target platform or target platform configuration.

Moreover, software or applications for safety critical systems commonly have become very large including a tremendous number of code lines, a few million lines of code, and accordingly too large for exhaustive testing. Thus, it is hazardous to use testing or profiling only, as it is impossible to observe every possible execution of a program to determine the WCET's to provide and ensure a reliable operation of said systems.

Currently, no technical solution is available solving these issues in an efficient way with sufficient quality and minimized technical and/or computational complexity and effort.

SUMMARY

An exemplary method for an optimized operation of real-time control applications and systems of an industrial automation having at least one data processor is disclosed, the method comprising: in the at least one data processor: identifying and processing recurring code sequences in the control applications to quantify the execution time of the control applications, wherein for each control application a timing data structure is generated to determine the execution time of a respective control application in the industrial automation; using domain-specific properties and determining execution times of control applications based the recurring code sequences; generating the timing data structure by at least one of automatically extracting recurring code sequences from a set of training applications and/or automatically identifying recurring code sequences in the respective control application; automatically generating test data to determine on-target execution times of the respective control application for refinement of the timing data structure; decomposing the timing data structure of the respective control application into code sequences for which the timing data structure and a timing model respectively provide execution time estimates, which are accessed and processed in a bottom-to-top sequence; determining an estimate for at least one of a best-case execution time and a worst-case execution time of the respective control application; reporting the estimate of the at least one best-case execution time and a worst-case execution time of the respective control application; and using the estimate to optimize a real time operation of the respective control application of the industrial automation.

An exemplary system for an optimized operation of real time control applications or systems in and industrial automation is disclosed, comprising: at least one data processing unit; at least one database for storing at least execution time information; and at least one interface for the input of data, wherein the at least one processing unit is configured with program code to include: an initial timing model generation unit that creates and/or generates an initial timing data structure or model for a CPU of a control device in an automation process by considering single instructions of an executable program code of a control application or application component only; a refinement unit that refines the initial timing data structure of the CPU using a set of control training applications to train and/or approve the initial timing data structure or model by extending the initial timing data structure to longer sequences of machine instructions, wherein the training applications are decomposed into smaller code pieces which are searched for recurring code sequences; and a comparison unit that compares model predictions and measurements, wherein depending on a comparison result the refinement unit is configured to further refine the initial timing data structure, and wherein comparison and refinement are performed on a cyclic basis as long as a desired accuracy is achieved and a final CPU timing model or data structure is determined and created, and an analyzing unit that decomposes the structure of a control application into code sequences for which the created timing data structure provides an execution time estimate, determines an estimate for at least one of the best-case execution time and the worst-case execution time of the control application, and reports at least one of the best-case execution time and the worst-case execution time.

BRIEF DESCRIPTION OF THE DRAWINGS

Through the accompanying drawings, exemplary embodiments and improvements of the disclosure and specific advantages of the disclosure shall be explained and illustrated in more detail.

FIG. 4 illustrates a basic block and window-based digest determination according to an exemplary embodiment of the disclosure;

FIG. 5 illustrates a first statistic evaluation of recurring code segments with different window sizes and stride areas in different domains according to an exemplary embodiment of the disclosure;

FIG. 6 illustrates a second statistic evaluation of recurring code segments with different window sizes and stride areas in different domains according to an exemplary embodiment of the disclosure.

DETAILED DESCRIPTION

Figure 1:
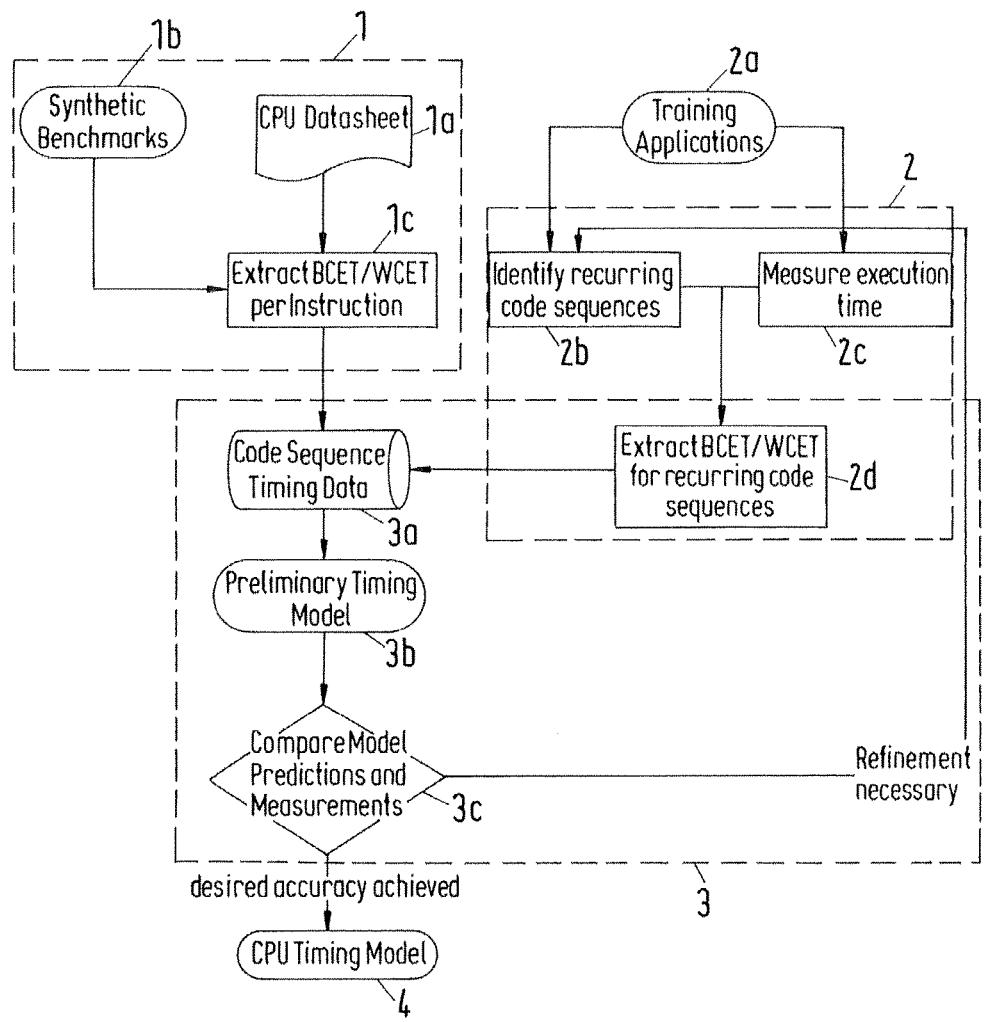
FIG. 1 illustrates an exemplary workflow of the method for an optimized operation of real-time embedded solutions in industrial automation according to an exemplary embodiment of the disclosure.

Exemplary embodiments of the disclosure provide a solution for an efficient and accurate execution time determination for real time processes to ensure and provide an optimized operation of a control system in automation industry.

According to an exemplary embodiment the solution includes a method for an optimized operation of real-time embedded solutions, such as control solutions, in an industrial automation that automatically creates an electronic reproduction of the used control hardware and applies a combination of testing and static analysis to said reproduction to determine the WCET as accurate as possible as a basis for an optimized configuration and operation of said hardware, and a determination and/or selection of suitable processing units for the execution of the respective code segments and the control system.

A control solution in the context of the present disclosure can be implemented in software or program executed by a processor as well as in hardware or a combination thereof.

According to another exemplary embodiment of the present disclosure, an exemplary method as well as an exemplary system for optimized operation of real-time embedded solutions in industrial automation and/or automation industry includes a timing data structure generation unit and at least one interface.

An exemplary method according to the present disclosure generates a timing data structure and includes steps of using domain-specific properties and characterizing and/or determining execution times of control applications based on recurring code sequences, wherein in generating the timing data structure, recurring code sequences are automatically extracted from a set of training applications and/or identified in the respective application, and steps of automatically generating test data to determine their on-target execution times for refinement of the timing data structure and steps of decomposing the structure of the respective control application into code sequences for which the created data timing structure and timing model respectively provide execution time estimates, which then can be accessed and processed by an accumulation in a bottom up fashion, and at least an estimate for the best-case execution time and/or the worst-case execution time of the control application is determined and/or reported and used to optimize the real time operation of the respective industrial control solution.

This structure ensures both a high efficiency and a high quality.

In another exemplary embodiment of the present disclosure, in a first process phase, an initial timing model for the controller CPU or data processing unit is constructed and/or determined by considering single instructions only and a best-case and an optimistic worst-case assumption with respect to the pipelined execution of an instruction, but best-case assumptions for the contents of the cache are determined and/or stored in a database.

This seems to be tricky for complex processors, because execution times for every instruction type of the CPU for the target controller have to be determined.

At this point it has to be denoted that a process phase according to the disclosure can include several process steps.

Furthermore, this information related to single instructions only can be extracted from the CPU data sheet or by using synthetic benchmarks to measure the execution time of a single instruction type.

Moreover, this process phase could be repeated for every new CPU of a controller. The resulting instruction-level estimates can then be used to automatically determine performance estimates as coarse-grained intervals for level control application as long as the occurrence of individual machine instructions can be counted.

The timing model of the CPU is refined using a set of control training applications to train the model or the data structure.

In another embodiment the refinement of the initial timing model or initial data structure is done at the level of individual diagrams or code blocks by identifying recurring code sequences, wherein code sequences could mean instruction sequences or sequences of IEC 61131-3 constructs.

In a further embodiment, for these recurring sequences, more precise estimates are obtained and/or determined by performing detailed analysis and/or measurements of the respective program parts, wherein a concrete implementation might be based on statistical analysis of instruction traces or machine learning.

In any case, the implementation can be able to track the execution time interval of code sequences, meaning both the best-case or worst-case execution times.

Furthermore, this refinement can take place as part of the development of a performance estimation tool or can even be guided by the control application developer to get more precise estimates for critical parts of the application.

This step is probably also very useful for diagrams provided as part of technical libraries.

Furthermore, the timing model or timing data structure does not only consider the execution time of code sequences in isolation, but it also provides information about their interleaving and interdependence.

After the timing model has been created, in a further refinement standard static analysis techniques can be applied and/or used to determine the possible execution of an arbitrary control application.

According to an exemplary embodiment disclosed herein, the structure of the control application is decomposed into code sequences for which the timing model can provide execution time estimates, wherein if no such information for longer code sequences is available in the timing model, the respective application and/or underlying algorithms are decomposed up to the level of individual machine instructions. The latter case is always possible and can make use of a best-case estimate as well as a worst-case estimate.

Accumulation is done in a bottom-up fashion (e.g., sequence).

In another exemplary embodiment, in considering the negative impact of caches or other shared resources, a markup should be added to the worst-case performance estimates created using the timing model. This markup might be based on empirical data, experience, knowledge based simulation, or execution of the control application. It is most likely possible to determine guidelines for the markup per controller variant based on similar refinement techniques as used during model development.

Furthermore, as a result, an estimate for the best-case execution time and the worst-case execution time of control applications is reported.

Instead of deriving the CPU timing model only once using a fixed set of applications, it could also be refined on-the-fly during normal application development. The only additional specification for this could be that controller hardware with sufficient measurement capabilities is available. This might even be done in the plant to observe realistic executions.

This technique can also be applied to any kind of estimation time (for example average-case estimation time (ACET) or best-case execution time calculations (BCET)) of software and for networking and/or processing components.

The exemplary method and system of the present disclosure are applicable for future control systems with multicore controllers and heterogeneous execution units. The model generation can be performed for each potential execution unit independently. The process of determining estimates for recurring code sequences can be highly automated, as the measurement setup can be reused for different execution units. During application development, the individual models can be used to decide which parts of application are best executed on which execution unit.

The disclosed system and method support the development and maintenance process of the plant by providing the information on how long it takes to execute a control algorithm on a controller with a given computation module.

Therefore, the method and system ensure that the deadlines are fulfilled and the plant will behave as intended, without creating a test setup or testing/measuring in the field. Furthermore, the cost of the controller hardware can be optimized as the disclosure allows choosing the computation module or processing unit with smallest cost still fulfilling the design specifications.

Exemplary embodiments of the present disclosure can also help in optimizing the implementation of a control algorithm by providing information about which parts of the software specify the most execution time on the controller.

Instead of using a static model of the target processor to estimate execution times, the method according to the disclosure uses recurring code sequences to quantify the execution time of control applications. The execution times of recurring code sequences are determined and/or obtained through measurements and are stored in an appropriate data structure or database. To determine an execution time estimate of a complete application, code sequences for which execution times are known are identified, for example, by the stored execution times, and then the respective execution times in the database are looked up and/or readout. In a further step, the available and/or retrieved execution times are processed and/or combined in a bottom-up fashion and an execution time estimate of the complete control application is determined and/or an estimate at least for the WCET of the respective application is determined and/or measured respectively.

In another exemplary embodiment described herein, the electronic reproductions are generated or created automatically, for example in several hours or a few days, which is of much less effort and much more effective than deriving a respective model or data structure as electronic reproduction of the hardware part of the control solution manually, which is a complex and time consuming process and costs at least about $100 k.

Exemplary embodiments of the present disclosure, are faster than known solutions because developing an electronic reproduction and underlying data structure or model for a new piece of hardware is time consuming, as it can take several months. Furthermore, the generation according to the exemplary embodiments described herein seems to be more accurate than previous approaches because it refines its estimations using testing of actual and/or real hardware.

Exemplary embodiments of the present disclosure provide a completely automated way of determining and/or calculating the model of execution times for a specific system, for example in the field of plant automation and/or automation industry, by testing code in a gradual way. It works by first testing individual instructions, and then increasing the size of the tested code up to the level of commonly used code sequences. Based on the execution time estimates for these commonly used code sequences, the execution time of arbitrary control applications can be estimated.

Exemplary embodiments of the present disclosure are improvements over known abstract, but complete models of CPU timing behavior with a model or data structure, which only covers those instruction sequences that are actually used by programs or applications in the targeted domain or technical field. This approach can significantly reduce the cost for developing such models and also can make them applicable in domains or fields/areas with less strict conditions. Furthermore, the proposed technique is not intended to generate a general purpose timing model for arbitrary applications.

To accurately estimate the best-case execution time (BCET), average-case execution time (ACET) and worst-case execution time (WCET) of a software component without specifying its execution to be observed, a timing model for the processor executing the software should be provided and/or should be available. The execution time of a sequence of machine instructions greatly depends on how these instructions move through the pipeline and the functional units of the respective data processing unit and how their execution can be interleaved.

The execution time of individual instructions, which can be retrieved for example from the processor manual or from repeatedly measuring the execution of the same instruction type, can only serve as a starting point for estimating the execution time of a complete program. On the other hand, the way machine code for control application is generated, for example, when using an ASEA Brown, Boveri (ABB) family of Control Builder tools or similar model-based tools, allows the reasonable assumption that certain sequences or patterns of instructions occur repeatedly.

Thus, in contrast to known static analysis methods, a general model or data structure of the processor pipeline can be omitted to obtain reasonably accurate performance estimates for control applications.

According to another exemplary embodiment of the disclosure, in one step a timing model for the used or applied data processing units, which can include CPUs used in industrial control devices, is generated and/or created.

According to exemplary embodiments disclosed herein, the generation and or creation of the timing model includes steps of generating an initial timing model of a CPU by considering single instructions only, wherein this initial model should at least contain best-case and worst-case execution time estimates for every instruction type of the respective data processing unit or CPU for the target controller, wherein this information can be extracted from the data processing unit or CPU data sheet and/or by using synthetic benchmarks to measure the execution time of a single instruction type This step has to be executed or repeated for every new CPU variant used in an industrial controller. The resulting instruction-level estimates could already be used to automatically determine coarse-grained performance estimates for every control application as long as the occurrence of individual machine instructions can be counted.

According to another exemplary embodiment, in a further step, subsequent to the creation of the baseline model, which baseline model only considers individual instructions, data processed to create or generate the timing model of the respective data processing unit or CPU is determined by using a set of control applications to train the model and/or by extending the timing model to longer sequences of machine instructions.

Furthermore, the training applications can be decomposed into smaller code pieces which are searched for recurring code sequences, wherein for these recurring sequences, more precise estimates can be obtained by performing detailed measurements of the respective program parts.

According to another exemplary embodiment, the execution time triple of each code sequence can be tracked, meaning the best-case, the average-case and the worst-case execution can be tracked, wherein estimating variations in the execution time of a program are allowed accordingly.

Furthermore, the timing model not only considers the execution time of code sequences in isolation, but also their interleaving and interdependence, that means if the execution time of a code sequence A is influenced by the fact that code sequence B is executed in advance, this information is also considered by the model.

Furthermore, for determining the execution time of recurring code sequences the execution time of relatively short instruction sequences is measured, which on most modern processor architectures, is only possible by adding instrumentation code.

When characterizing the execution time of recurring code sequences; there can be a trade-off between the efforts to perform the measurements and the accuracy of the characterization. For example, the overhead added to measurements by adding instrumentation code should be considered.

Another known challenge for the timing characterization is in observing all relevant execution times. This challenged can be addressed by extensive testing during model generation. One option is to use the existing test cases for the training applications from which the timing model is generated. As the main purpose of such test cases is not the generation of a CPU timing data structure or model, additional tests can be called for.

Therefore, according to an exemplary embodiment of the present disclosure, a testing unit is provided to apply automatic test case generation techniques, wherein approaches like random and/or concolic testing are used to generate input data for the measurements in the final implementation of the proposed approach.

A test of small portions of binary code with arbitrary inputs might also be applicable. The important difference between the exemplary work flow of the present disclosure and known measurement-based timing analysis tools is that timing measurements have to be performed only once per target processor and not once per application.

The effort for setting up a test environment and measurement facilities will therefore only be performed once. The execution time measurements are formalized by applying sophisticated test case generation techniques. Furthermore, it is not necessary that the user of the resulting timing model have access to the target hardware to generate timing estimates for a newly developed application.

The second important property is the integration of average-case execution times for the recurring code sequences into the model. This allows reasoning about the average load of the targeted device without running the software on the actual hardware. To achieve this, the model should store the best-case, the average-case, and the worst-case execution time for each recurring code sequence.

In order to present the information about the execution time to the developer and to allow a fine-grained consideration of the program structure in the execution time analysis, a tight integration into the software development environment can be key. Exemplary embodiments of the present disclosure can provide variation in the execution time of software or an application component explicit and thus enables the developer and/or operator to make more accurate decisions whether all real-time demands of the application can be met under the expected conditions.

After a timing model has been created for a target processor unit using a set of training applications, the resulting timing model and/or data structure can be used to estimate the execution time of newly developed applications. Thus, it could serve as a replacement for the microarchitectural analysis of existing analysis tool chains. However, exemplary embodiments described herein can still lead to overly pessimistic execution time estimates due to incorrectly approximated program control flow. Nonetheless, the previously described approach for an automatic timing model generation overcomes the demands for additional measurements and access to hardware during software development, while the effort for developing a timing model is reduced.

Moreover, according to another exemplary embodiment, after the timing model has been created automatically the possible execution of an arbitrary control application is determined by use of standard static analysis techniques.

In another embodiment in a further step the structure of the control application is decomposed into code sequences for which the timing model can provide execution time estimates.

If no information for longer code sequences is available in the timing model, in a further step the respective program or code sequence is decomposed up to the level of individual machine instructions. The latter case is always possible and can make use of the information from the baseline model.

Using the timing model created by the proposed approach, the execution time of newly developed applications can be performed through a bottom-up accumulation of execution times of recurring code sequences, for example, based on the control flow graph of the program.

According to another exemplary embodiment of the present disclosure, the model refinement continues until the predictions of the generated model or data structure fulfill the desired timing accuracy, which can be checked by comparing the predictions of the model to end-to-end execution time measurements of the training applications.

The fundamental basis for the proposed timing model generation is that recurring code patterns exist in the application code and that these recurring code patterns are detected automatically, wherein code clone detection techniques are applied and performed to detect these recurring code patterns in the machine code.

In a further exemplary embodiment, the searching for recurring code sequences is performed and/or executed by looking for verbatim copies.

For source code, this could mean searching for identical character sequences in the source code, but discarding white space. The binary-level equivalent for this approach could be to search for sequences in the machine code which are identical down to the last bit.

As two pieces of code with the same origin and identical functionality do not have to be completely isomorphic, for example, due to some renaming of variables in the source code or using different registers for the same machine code operations, code clone detection techniques usually apply different forms of normalization to the analyzed program.

According to yet another exemplary embodiment, for code clone detection at the machine code level, normalization techniques include discarding the order of instructions, abstracting the opcodes into certain classes, or translating the arguments of machine code operations into a symbolic form are applied and/or executed.

Furthermore, these normalization techniques can be applied to certain code areas, like for example, instruction sequences of a fixed length. The result can be a vector of attributes, for example, a vector containing number of instructions with a given opcode (operation code), or a hash value of the normalized instruction sequence.

This normalized representation can be used to efficiently compare code areas to detect similar code areas and thus, code clones or potential code clones.

For the purpose of defining the execution time of recurring code sequences there are several constraints for applying known normalization techniques: The order of machine instructions should not be discarded as the execution order has a significant impact on execution time. The same holds for operands of an instruction, but to a lesser extent.

Furthermore, in another refinement to simplify the detection of recurring code sequences, the detection algorithm can focus on sequences of instruction opcodes only. Thus, an MD5 hash for the opcodes within basic blocks is created and/or computed and used as normalized characterization of the application code. The MD5 hash message-digest algorithm is a commonly used cryptographic hash function producing a 128-bit (16-byte) hash value, which can be expressed in text format as a 32 digit hexadecimal number.

In another exemplary embodiment, for a given sequence of machine instructions, including their address, input registers and intermediate constants, only the opcode of the instruction is used for computing the MD5 digest of the sequence.

Furthermore, basic blocks can be further decomposed when searching for recurring sequences, but the sequences used for clone detection cannot span multiple basic blocks. Therefore, each considered sequence could contain at most one branch instruction.

According to another exemplary embodiment of the present disclosure, an exemplary system for an optimized operation of real time embedded solutions in industrial automation can include at least one data processing unit, at least one database for the storage of execution time information and at least one interface for the input of data, wherein an initial timing model generation unit is provided, which creates and/or generates an initial timing data structure or model for a CPU of a control device in an automation process by considering single instructions of an executable program code of a control application or application component only, and wherein a refinement unit is provided by which the initial timing data structure of the CPU is refined using a set of control training applications to train and/or approve the initial timing structure or model by extending the timing model to longer sequences of machine instructions and wherein the training applications are decomposed into smaller code pieces which are searched for recurring code sequences and a comparison unit is provided which compares model predictions and measurements and depending on the results a further refinement of the time execution model or data structure by the refinement unit is performed and wherein comparison and refinement are performed on a cyclic basis as long as the desired accuracy is achieved and a final CPU timing model or data structure is determined and created, and wherein an analyzing unit is provided decomposing the structure of a control application into code sequences for which the created data timing structure and timing model respectively can provide execution time estimates, which then can be looked up or be retrieved and processed, for example, by an accumulation in a bottom up fashion, and at least an estimate for the best-case execution time and the worst-case execution time of the control application is determined and/or reported.

This process can be problematic for rather complex processors because of the big effort to determine the execution time for every instruction type of the CPU for the target controller, which can be extracted from the CPU data sheet or by using or applying synthetic benchmarks to measure the execution time of a single and/or individual instruction type.

The resulting instruction-level estimates could be used to automatically determine performance estimates as coarse-grained intervals for every control application as long as the occurrence of individual machine instructions can be counted.

Furthermore, the created model or data structure does not only consider the execution time of code sequences in isolation, but it also provides information about their interleaving and interdependence.

If no information for longer code sequences is available in the timing model the program can be decomposed up to the level of individual machine instructions, which is always possible and can make use of a best-case estimate as well as a worst-case estimate.

To consider the negative impact of caches or other shared resources, in a further embodiment an interface offering a manual markup functionality is provided.

This markup might be based on experience, simulation, or execution of the control application. It is most likely possible to determine guidelines for the markup per controller variant based on similar refinement techniques as used during model development.

In yet another exemplary embodiment of the present disclosure, the report can be performed by a display device and or a graphical interface.

Furthermore the system is equipped and includes all the specified means to execute the corresponding method.

Concerning the further system features we refer to the features of the corresponding method.

FIG. 1 illustrates an exemplary workflow of the method for an optimized operation of real-time embedded solutions in industrial automation according to an exemplary embodiment of the disclosure. As shown in FIG. 1, in a first process or workflow phase 1 an initial timing data structure or model for a CPU of a control device in an automation process is constructed and created by considering single instructions of an executable program code of a control application or application component only.

The result is a best-case and a worst-case assumption 1c with respect to the pipelined execution of an instruction, but best-case assumption for the contents of the cache.

This process can present problems for rather complex processors because of the big effort to determine the execution time for every instruction type of the CPU for the target controller.

This information can be extracted from the CPU data sheet 1a or by using or applying synthetic benchmarks 1b to measure the execution time of a single and/or individual instruction type.

This workflow phase 1 according to the method could have to be repeated for every new CPU of a controller. The resulting instruction-level estimates could be used to automatically determine performance estimates as coarse-grained intervals for every control application as long as the occurrence of individual machine instructions can be counted.

The initial timing data structure of the CPU is refined using a set of control "training" applications 2a to train and/or approve the structure in a second workflow phase 2, wherein in the second phase 2 the refinement is performed by extending the timing model to longer sequences of machine instructions and wherein the training applications are decomposed into smaller code pieces which are searched for recurring code sequences.

The refinement is done at the level of individual diagrams or code blocks by identifying recurring code sequences 2b, wherein code sequences in the context of this application are instruction sequences/command sequences or sequences of IEC 61131-3 constructs.

For these recurring sequences, more precise estimates are obtained by performing detailed execution time measurements 2c of the respective program parts.

A concrete implementation might be based on statistical analysis of instruction traces or machine learning. In any case, the implementation is able to track the execution time interval of code sequences, meaning both the best-case and worst-case execution times and/or to store them in a respective database.

This refinement could take place as part of the development of a performance estimation tool or could even be guided by a control application developer, for example to get more precise estimates for critical parts of the application. This step is probably also very useful for diagrams provided as part of for example ABB libraries.

Furthermore, the created model or data structure does not only consider the execution time of code sequences in isolation, but it also provides information about their interleaving and interdependence. Thus if the execution time of a code sequence A is influenced by the fact that code sequence B is executed in advance, this information is also considered by the created model or data structure.

After, based on the stored code sequence timing data 3a, a preliminary timing model 3b has been created in a third workflow phase 3, wherein in a further step model predictions and measurements are compared and the second phase 2 as well as the third phase 3 are repeated until the desired accuracy is achieved and finally the CPU timing model 4 is determined and created.

Figure 2:
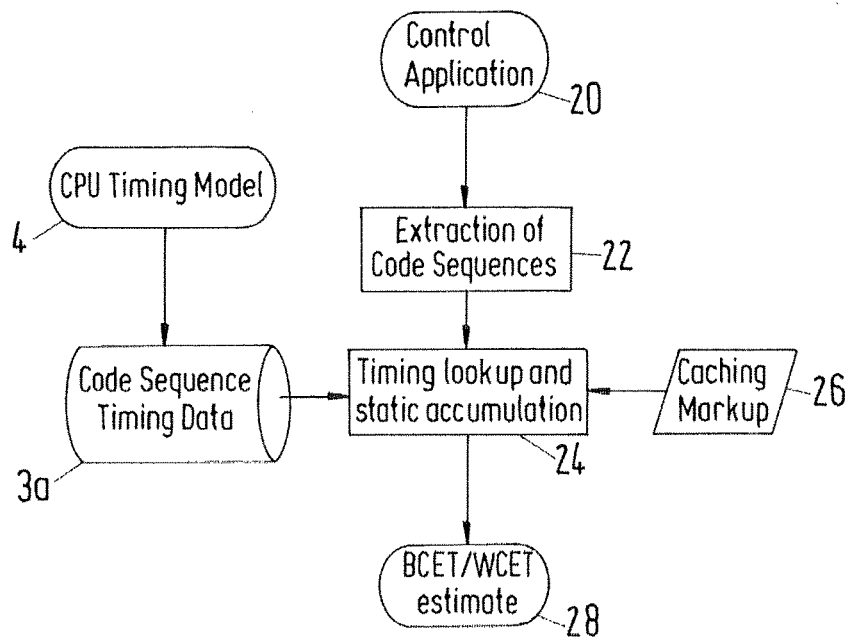
FIG. 2 illustrates an execution time estimation workflow according to an exemplary embodiment of the disclosure.

Furthermore standard static analysis techniques can be applied and used to determine the possible execution time of an arbitrary control application. FIG. 2 illustrates an execution time estimation workflow according to an exemplary embodiment of the disclosure.

Stepwise the structure of the control application 20 has to be decomposed into code sequences 22 for which the created data timing structure and timing model 4 respectively can provide execution time estimates 3a, which then can be looked up or be retrieved and processed 24.

If no information for longer code sequences is available in the timing model in a further step the program can be decomposed up to the level of individual machine instructions.

The latter case is always possible and can make use of a best-case estimate as well as a worst-case estimate.

Accumulation 24 is done in a bottom-up fashion (e.g., sequence), by using the syntax tree of the program.

To consider the negative impact of caches or other shared resources, in a further step a markup 26 should be added to the worst-case performance estimates created using the timing model and timing data structure 4 respectively.

This markup 26 might be based on experience, simulation, or execution of the control application. It is most likely possible to determine guidelines for the markup 26 per controller variant based on similar refinement techniques as used during model development.

As a result, an estimate for the best-case execution time (BCET) and the worst-case execution time (WCET) of control applications is reported 28.

According to an exemplary embodiment disclosed herein, programming and/or engineering tools control applications are developed using code generation from graphical representations based on frequently reused subcomponents (libraries). This allows the reasonable assumption that certain sequences or patterns of instructions occur repeatedly. Thus, a general model or data structure of processor pipeline can be omitted to get reasonably accurate performance estimates for control applications and the presented disclosure should be applicable for this class of programs.

The exemplary embodiments of the present disclosure can be applicable also for future control systems with multicore controllers and heterogeneous execution units.

The model generation can be performed for each potential execution unit independently. The process of determining estimates for recurring code sequences can be highly automated, as the measurement setup can be reused for different execution units.

During application development, the individual models can be used to decide which parts of application are best executed on which execution unit. This can also be important during operation of a control or a number of control devices in automation and/or process industry in view of maintenance and upgrade as well as reparation activities.

Figure 3:
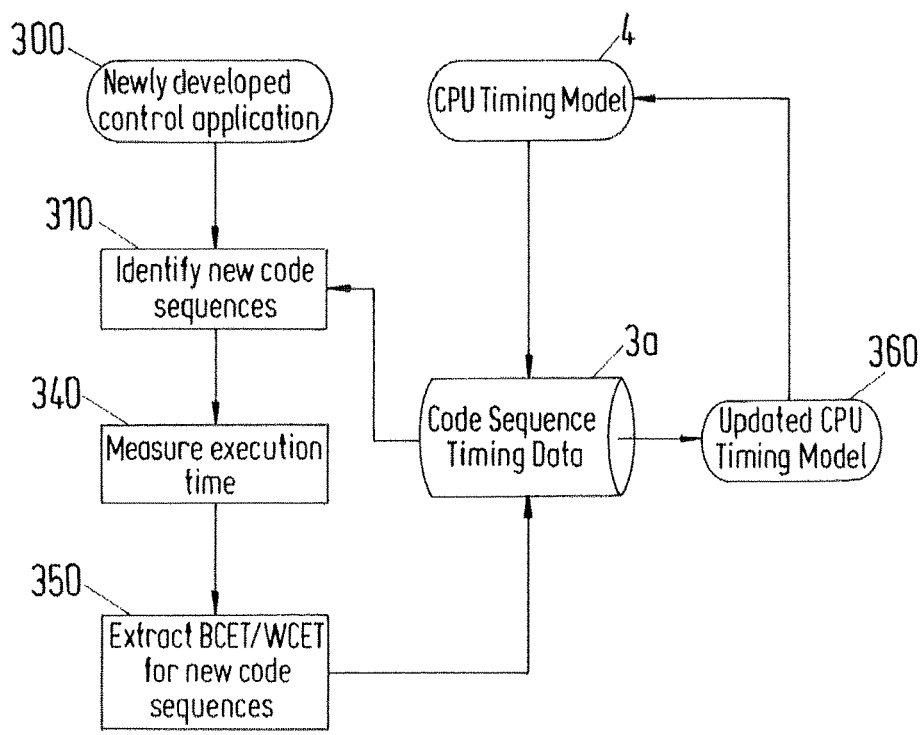
FIG. 3 illustrates a timing data structure refining workflow according to an exemplary embodiment of the disclosure.

FIG. 3 illustrates a timing data structure refining workflow according to an exemplary embodiment of the disclosure. According to another exemplary embodiment, instead of deriving the CPU timing model and data structure respectively only once using a fixed set of applications, the CPU timing model and data structure could also be refined on-the-fly during normal application development. The only additional conditions for this could be that controller hardware with sufficient measurement capabilities is available. This might even be done in the plant to observe realistic executions. In FIG. 3 a workflow or process for refining the timing data structure during development of a new control application is presented, wherein starting from the newly developed application 300 in a first step 310 new code sequences in the new control application are identified based on the available and provided CPU timing data structure 4 and code sequence timing data accessibly stored in a code sequence timing database 3a. In a second step 340, the respective execution times for the identified sequences are measured. In a further step 350, the BCET and/or WCET for the new code sequences are determined and transferred to and/or stored in the code sequence database 3a. Furthermore, the determined BCET and/or WCET values are used and processed in at least one further processing step 360 to update and/or modify the CPU timing data structure 4.

FIGS. 4a and 4b illustrate a basic block and window-based digest determination according to an exemplary embodiment of the disclosure. The exemplary machine code shown in FIG. 4a was generated using ABB's engineering tool Compact Control Builder, which is used to develop control applications. For the most coarse-grained variant on the left side, all instructions of a basic block are used directly. This means that the value of Digest 1 is computed by applying the MD5 hash function to the opcode sequence (mflr, stwu, stw, lwz, lwz, lwz, cmpwi, bc). For all other basic blocks, which are marked with a label in the code, the digest is computed in the same way.

In another exemplary embodiment and for a more fine-grained characterization, digests can be calculated using a sliding window approach which splits up the basic blocks in the machine code, wherein to generate instruction sequences from a basic block, sequences are determined by moving a window of fixed size across the basic block using a fixed stride.

This is illustrated in FIG. 4b using a window size of 4 instructions and a stride of 2 instructions. For Digest 1, the hash value of the opcode sequence (mflr, stwu, stw, lwz) is computed. The stride value can only be less than or equal to the window size, because otherwise not all instructions from the basic block could be included.

Choosing the stride value smaller than the window size makes it more likely to capture recurring sequences. At the end of a basic block, the window size is pruned if it could otherwise move across the end of the basic block. For the last window of this example, the window size is pruned and thus Digest 9 is computed only from the single opcode blr.

Moreover, in a further step after the training applications for timing model generation have been partitioned into digests, the digest values can be used to detect recurring code sequences. The underlying assumption and rule is that sequences with identical digests will have identical execution times. To reduce the measurement effort for characterizing the execution time of the recurring sequences, the number of sequences contained in the timing model is as small as possible. On the other hand, the model should contain enough instruction sequences so falling back to the single instruction baseline model when characterizing the execution time of a newly developed control application can be limited.

FIG. 5 illustrates a first statistic evaluation of recurring code segments with different window sizes and stride areas in different domains according to an exemplary embodiment of the disclosure; and FIG. 6 illustrates a second statistic evaluation of recurring code segments with different window sizes and stride areas in different domains according to an exemplary embodiment of the disclosure. FIGS. 5 and 6 show exemplary statistic evaluations of recurring code segments with different window sizes and stride areas in different domains, such as oil gas and paper (OGP) and mining industry are presented for a better understanding of the relation and dependencies between number of recurring regions, window size and stride size.

Furthermore, to facilitate the use of the timing model, a 3-valued representation of the potential execution times is proposed. Accordingly, the application's ACET, BCET and WCET can directly be presented to the user. Thereby, the user is much better informed about the application's potential behavior already in the development phase and operational phase and additionally gets direct feedback on application changes.

Figures 7, 8:
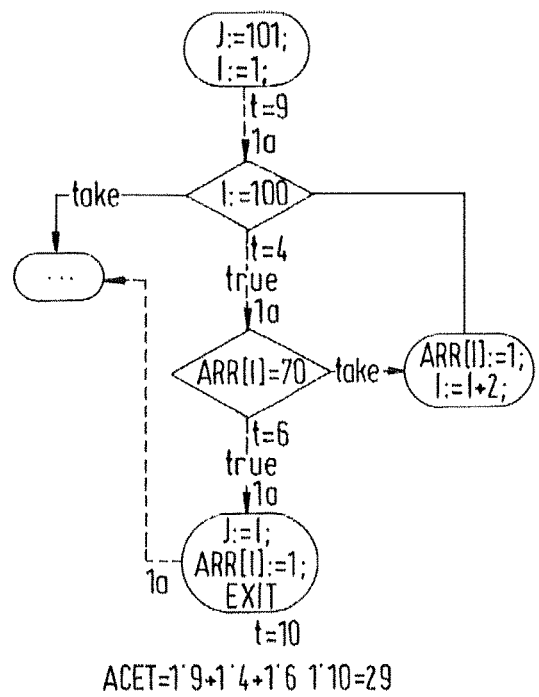
FIG. 7 illustrates an exemplary execution and marked code sequence according to an exemplary embodiment of the disclosure.
FIG. 8 illustrates case execution time estimation according to an exemplary embodiment of the disclosure.

FIG. 7 illustrates an exemplary execution and marked code sequence according to an exemplary embodiment of the disclosure. For example, a mock-up of how the timing model of FIGS. 5 and 6 could look is shown at the bottom of FIG. 7.

Moreover, in addition to give feedback to the user or operator, the average-case execution time estimate can be significantly improved by only considering parts of the application which are included in a normal execution. Therefore, the user or operator has to provide the insight about the expected or common program path—which often can be done due to the user's and/or operator's experience and knowledge of the application. In combination with the previously described ACET estimates for recurring code sequences and structural program information, a more accurate approximation of the known case can be achieved.

The reason for this is that execution time outliers are less likely to impact the result of the average-case estimate. The standard way of simply averaging the executing time of observed program runs to get an ACET estimate could still include such outliers, but the proposed approach allows excluding such normal executions. Finally, the 3-valued representation of the execution times still makes the worst case explicit to the user and thus, no information is lost compared to a standard WCET analysis.

In another exemplary embodiment, if the programmer of the code shown in FIG. 7 or the operator recognizes that conditional expressions in the loop can evaluate to "true" immediately, they can mark the respective code area as being part of the normal execution. This is illustrated in FIG. 7 by shading the respective code area.

A similar tagging functionality could be easily added to any code editor. While this is an artificial example, similar patterns can often be found in control applications, for example, for initialization code.

In another exemplary embodiment, this information can automatically be translated into constraints for the global bound calculation analysis step, it can be used to restrict the program paths through the CFG. Thus, the program path determined by the global analysis for the ACET step no longer considers the worst-case path, but the normal path.

FIG. 8 illustrates case execution time estimation according to an exemplary embodiment of the disclosure. For example, the resulting program path is shown in FIG. 8. The edges drawn as dotted lines and the frequency annotations next to them describe the normal path. Consequently, each of the basic blocks along this path is executed exactly once. Using this information and the execution time of each basic block, which is also annotated to the CFG in FIG. 8, an ACET of 25 cycles can be derived. The respective ACET formula is shown in the lower portion of FIG. 8. Even if there is only small difference between the average-case and the worst-case execution time of the basic blocks, considering information about the normal program path can still reduce the overestimation of static timing analysis. While existing WCET analysis tools already support similar path constraints, the underlying timing model is always a pure worst-case analysis.

The combination of the ACET estimates and the user-provided information about the normal program path allows for characterizing the average execution time of programs more accurately than with existing solutions. Thus, it goes beyond classical BCET and WCET analysis. Because the results of the WCET and BCET analysis are still represented, the information is still available to the user of the timing analysis.

Adding average-case information allows to additionally reason about the load of a computer system by considering normal execution paths only. The exemplary approach of the present disclosure depends, however, on the user's correct knowledge on the normal execution path. Thus, we are planning to case-study the quality of user input and the impact of wrong assumptions, for example, mistakenly unmarked normal code areas or wrongly marked code areas, on calculated ACET estimates with real industrial applications and users.

The 3-valued execution time estimation can be applied at different levels of granularity, for example, complete applications, components, or individual source code lines. We envision an integration of this representation into the integrated development environment for the developers of control applications, illustrated in the lower portion of FIG. 7. By integrating this representation into the application development environment, the contribution of individual program parts is directly presented to the application developer. Thereby the 3-valued representation makes the possible variation of execution times explicit to the developer. In addition, program parts with a high contribution to the execution time are highlighted directly if the 3-valued execution time estimate is represented at the level of basic blocks or individual code lines. To adapt the 3-valued execution time estimate, the developer can mark program areas as being not part of a normal execution. This will exclude the respective program parts from the average case execution time estimate. According to an exemplary embodiment, the offending program parts can be optimized manually by the developer and the 3-valued estimate can instantly provide information about the impact of the code changes on the execution time.

In the context of industrial control applications, code portions which belong to an atypical (e.g., abnormal) execution path can often be identified automatically. The result of a certain firmware function directly relates to whether the controller is in a normal state or not. For example in most executions of a control application, the firmware function which checks whether the device just experienced a warm restart will return false.

Thus, when the respective function is used in a conditional expression, this can directly be translated into a constraint for the average-case analysis. When performing a worst-case analysis, these constraints should of course not be used as they might lead to an underestimation of the WCET.

Marking certain code areas as the normal execution path excludes alternative paths from the WCET analysis and thus approximates the expected behavior more accurately. Depending on the application for which the execution time is estimated, the user-provided information could also be used to tag code areas for other scenario-based analyses. This allows for a more accurate estimation of the execution time under certain preconditions. The proposed approach could therefore also be extended for analyzing the execution time of a program under specific operating conditions.

Exemplary embodiments of the present disclosure provide techniques for automatically creating a timing model and timing structure respectively for a given processing unit and for the static estimation of average-case software execution times based on user feedback. These concepts were originally developed in the context of industrial control applications, but they likely are also applicable in other fields of software development. The assumption that control applications contain a significant amount of recurring code sequences has been verified by initial experiments based on real industrial applications. The results also show that a certain level of decomposition should be used to derive generic models for software execution times on a given processor, for example using basic blocks as the level of granularity for timing model generation is insufficient for reaching the desired coverage.

Thus, only focusing on direct code reuse, for example, through software library, types which are reused across many applications, will not be sufficient to generate an accurate timing model.

Characterizing instruction sequences using a sliding window approach is more appropriate, although it potentially creates a lot of overlapping code patterns. It should be possible to overcome this issue if the timing model generation considers instruction coverage when generating sliding windows.

Code sequences generated from the sliding window approach should only be integrated to the model if instruction coverage is improved.

The recurring code sequences, which are the basis of an automatically generated timing model, are ideally in the order of ten instructions. This fact implies that performance measurements should ideally be possible at the same level of granularity. Alternatively, the execution time of shorter code sequences should be extracted from measurements for longer sequences because the former is unlikely for a complex processor design.

Another aspect is the relation between the recurring code sequences considered by the timing model and the provided timing accuracy.

According to another exemplary embodiment, the timing model, the available and/or contained timing information related to recurring code sequences, is used and processed to determine the execution time of control applications with a similar structure.

Moreover, the model is also applicable to applications that are created using the same set of tools.

This approach is thus an alternative to the known practice of manually developing timing models, for example, as used in commercial tools for static timing analysis.

The exemplary embodiments of the present disclosure also includes any combination of exemplary embodiments as well as individual features and developments provided they do not exclude each other.

According to exemplary embodiments of the present disclosure the hardware can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The general processor(s) can be configured to include and perform features of the exemplary embodiments of the present disclosure such as, method for an optimized operation of real-time control applications and systems of an industrial automation, and thereby function as a special and unique processor. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for an optimized operation of a real-time control application for an industrial automation controller having at least one data processor, the method comprising:
in the at least one data processor:
generating an initial timing model of the at least one data processor by considering single instructions only, execution times of the single instructions being extracted from a data sheet for the data processor or by using or applying synthetic benchmarks to measure execution times of the single instructions, wherein the initial timing model at least contains best-case and worst-case execution time estimates for every instruction type of the at least one data processor;
refining the initial timing data model using a set of training applications to train and/or approve the initial data model, wherein the initial timing data model is extended to longer sequences of machine instructions;

generating a final timing data model based on the initial timing data model;

identifying recurring code sequences in the real-time control application;

measuring execution times of the recurring code sequences, wherein the measured execution times of the recurring code sequences are more precise than the execution times of the single instructions;

processing the recurring code sequences to quantify an execution time of the real-time control application using the final timing data model;

using domain-specific properties and determining the execution times of the real 0 time control application based on the recurring code sequences;

generating the initial or final timing data model by at least one of automatically extracting the recurring code sequences from the set of training applications and/or automatically identifying the recurring code sequences in the control application;

automatically generating test data to determine on-target execution times of the control application for refinement of the final timing data model;

decomposing the final timing data model of the control application into code sequences to provide execution time estimates, which are accessed and processed in a bottom-up sequence to quantify the execution time of the real-time control application;

determining an estimate for at least one of a best-case execution time and a worst-case execution time of the control application;

reporting the estimate of the at least one best-case execution time and a worst-case execution time of the control application;

the industrial automation controller controlling a device or process in real-time in cyclic fashion with each cycle being limited by a predetermined interval; and ensuring that the real-time control application finishes operations within the predetermined interval.

2. The method according to claim 1, wherein the execution times of the identified recurring code sequences are stored in an appropriate data structure or database.

3. The method according to claim 2, wherein to obtain an execution time estimate of a complete application, the code sequences for which execution times are known are identified and corresponding execution times are extracted from the database and are combined in a bottom-to-top sequence to yield an estimate for the worst-case execution time of the real-time control application.

4. The method according to claim 1, wherein the best-case and the worst-case execution time estimates for every instruction are determined for every new CPU variant used in a respective industrial automation controller.

5. The method according to claim 1, wherein the instruction-level estimates are used to automatically determine coarse-grained performance estimates for the real-time control application as long as the occurrence of individual machine instructions can be counted.

6. The method according to claim 1, wherein subsequent to creating a baseline model, which baseline model only considers individual instructions, data to be processed to create or generate a respective timing model of the data processing unit or CPU is determined by using a set of control applications to train the respective timing model and/or by extending the respective timing model to longer sequences of machine instructions.

* * * * *